F. J. CAMERON.
DRIP PAN.
APPLICATION FILED JULY 26, 1909.
973,474.
Patented Oct. 25, 1910.
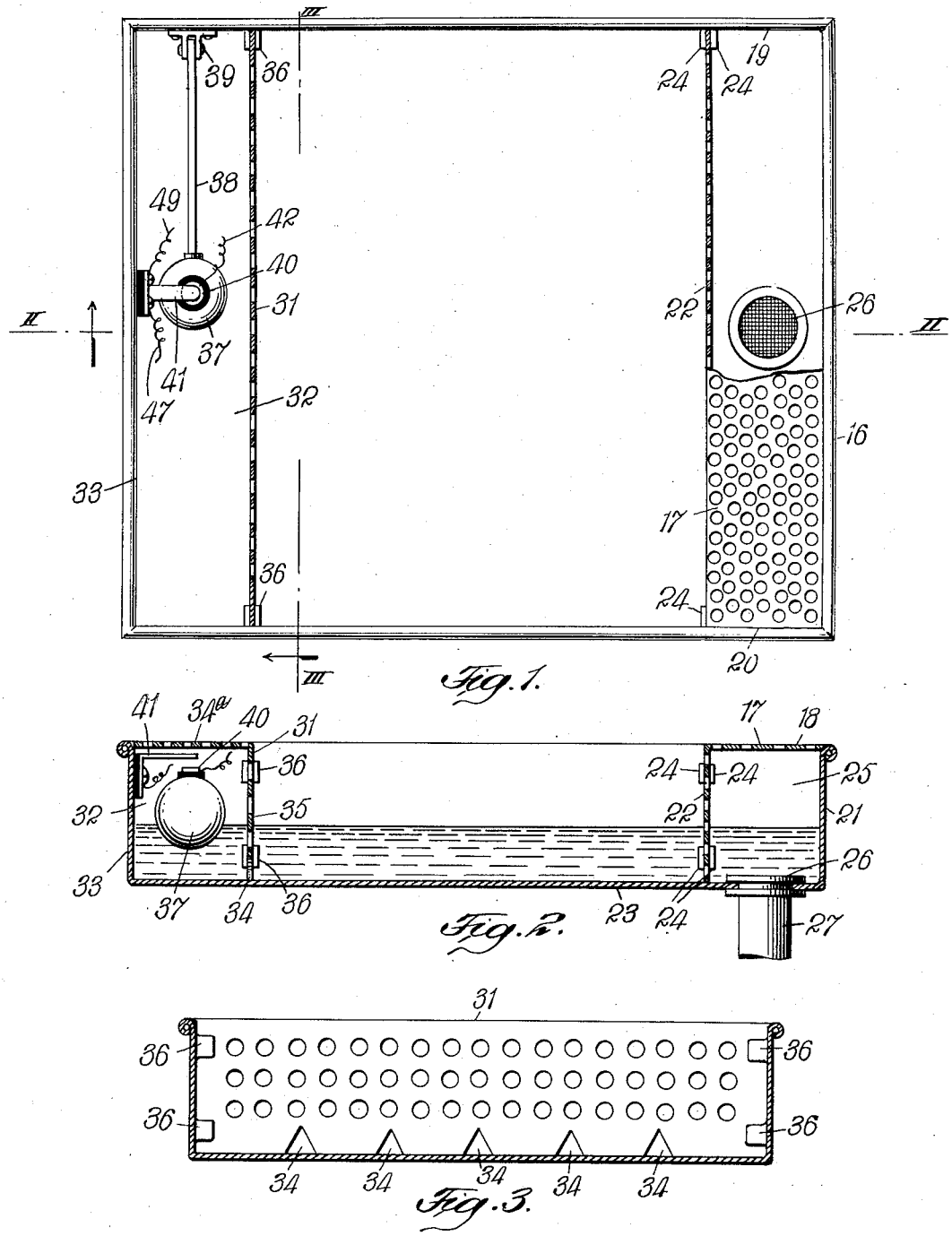

UNITED STATES PATENT OFFICE.

FRANCIS J. CAMERON, OF NEW YORK, N. Y.

DRIP-PAN.

973,474.  Specification of Letters Patent.  Patented Oct. 25, 1910.

Application filed July 26, 1909. Serial No. 509,695.

*To all whom it may concern:*

Be it known that I, FRANCIS J. CAMERON, a citizen of the United States, and a resident of New York, county and State of New York, have invented certain new and useful Improvements in Drip-Pans, of which the following is a full, clear, and exact description.

This invention relates more particularly to drip pans adapted for use in connection with refrigerators.

The object of the invention is to provide a simple and efficient drip pan which is not likely to get out of order and which may be cheaply made and installed in position for use.

The invention will be hereinafter described with reference to the accompanying drawings, which form a part of this specification, and will then be pointed out in the claim at the end of the description.

In the drawings, Figure 1 is a plan view, partly in section, of one form of pan embodying my invention. Fig. 2 is a vertical section, taken on the line II—II of Fig. 1. Fig. 3 is a vertical transverse section, taken on the line III—III of Fig. 1.

While I show and shall describe a drip pan used in connection with a refrigerator, it will be understood that said pan may be employed in other connections and for various purposes.

The reference numeral 16 designates a drip pan which may be cast or made of sheet metal and substantially rectangular in form. At one side of the body of the pan or receptacle is arranged a plate 17 and this plate is perforated to permit water to pass through the same, though instead of a plate a grating or wire mesh of any suitable kind may be employed, and said plate is made angular and has a part 18 extending horizontally between the side walls 19 and 20 of the body so that one edge will rest upon the end wall 21 at the top thereof. This plate 17 has its vertical side 22 adapted to rest on the bottom 23 of the pan, and said pan is provided with lugs, as 24, forming grooves between the same in which the side or part 22 of the plate 17 is adapted to be detachably held. The plate 17 serves to prevent refuse or other matter, except the water from entering the space or chamber 25, and said chamber 25 is provided with a discharge opening having a strainer 26 and which is connected by a pipe 27 to a discharge pipe (not shown).

The pan 16 is provided with a plate 31 somewhat similar to the plate 17 and located at the opposite end of the pan and forms a compartment 32 between the end wall 33 and said plate. This plate is angular in form and may be perforated throughout its entire width or only for a part of the same, in which case the said plate or division element may be provided with V-shaped or other slots 34 at the lower edge thereof which will permit the water to flow freely into the compartment 32, but which will serve to prevent refuse, as for example slime resulting from the melting of the ice, passing into the compartment 32. The plate or element 31 has a horizontally-extending part or side 34ª and a vertically-arranged side 35 in which are the grooves or slots 34, and said vertical side 35 is held between the lugs 36 which form a groove between them so that the said plate or element may be removed at will.

To signal or ring an alarm, I provide within the compartment 32 a float 37 and so connect the float that it will ring an electric bell or other signaling means. As shown the float 37 is held to an arm 38 which is pivoted to a bracket 39 secured to the side 19 of the pan, and arranged on the float is a contact 40 which may be insulated from the float 37. A contact 41 may be insulated from the body of the pan, and this contact is adapted to be engaged by the contact 40 to close an electric circuit when the float rises beyond a certain height. The contact 40 on the float of the drip pan is connected to a wire 42 of an electric bell circuit. The contact 41 is connected in the bell circuit by a wire 47.

As will be seen when the water rises to a certain height in the drip pan, the float 37 will be raised causing the contact 40 to engage the contact 41. This will complete the circuit to ring an alarm.

The horizontal portions 18 and 34ª of the perforated angular plates prevent the dropping of refuse into the compartments 25 and 32, and the lugs 24 and 36 coacting with the edges of the horizontal portions of the plates which rest upon the edges of the pan securely hold the plates in position.

Having thus described my invention, I claim as new and desire to secure by Letters Patent:—

The combination with a drip pan having a rectangular body provided on the inner surfaces of its sides with parallel lugs, of oppositely-disposed perforated angular plates, the vertical portions of which fit between said lugs while their horizontal portions rest upon the edges of the pan, said plates providing end compartments within the pan.

This specification signed and witnessed this 23rd day of July A. D. 1909.

FRANCIS J. CAMERON.

Witnesses:
W. A. TOWNER, Jr.,
C. BARTELS.